United States Patent
Rao

(10) Patent No.: US 11,908,108 B2
(45) Date of Patent: Feb. 20, 2024

(54) IMAGE CORRECTION METHOD AND PROCESSOR

(71) Applicant: SigmaStar Technology Ltd., Fuijan (CN)

(72) Inventor: Jing-Song Rao, Xiamen (CN)

(73) Assignee: SIGMASTAR TECHNOLOGY LTD., Fujian (CN)

(*) Notice: Subject to any disclaimer, the term of this patent is extended or adjusted under 35 U.S.C. 154(b) by 0 days.

(21) Appl. No.: 17/711,167

(22) Filed: Apr. 1, 2022

(65) Prior Publication Data
US 2023/0097901 A1    Mar. 30, 2023

(30) Foreign Application Priority Data

Sep. 23, 2021  (CN) .......................... 202111115988.2

(51) Int. Cl.
*G06T 5/00*     (2006.01)
*G06V 10/32*    (2022.01)
*G06V 10/26*    (2022.01)
*G06K 7/14*     (2006.01)

(52) U.S. Cl.
CPC ............ *G06T 5/006* (2013.01); *G06K 7/1417* (2013.01); *G06V 10/26* (2022.01); *G06V 10/32* (2022.01)

(58) Field of Classification Search
CPC . G06T 5/006; G06T 7/11; G06T 2207/10004; G06T 2207/20021; G06T 2207/20164; G06K 7/1417; G06V 10/26; G06V 10/32; G06V 10/462
See application file for complete search history.

(56) References Cited

U.S. PATENT DOCUMENTS

| | | | |
|---|---|---|---|
| 2007/0051813 A1* | 3/2007 | Kiuchi | G06K 7/14 235/462.1 |
| 2019/0295256 A1* | 9/2019 | Yang | G06T 5/002 |
| 2021/0042485 A1* | 2/2021 | Ota | G06K 7/1447 |
| 2022/0129654 A1* | 4/2022 | Sharma | G06K 7/1417 |
| 2022/0207669 A1* | 6/2022 | Kuo | G06T 3/4038 |

FOREIGN PATENT DOCUMENTS

| | | | |
|---|---|---|---|
| CN | 113963067 A | * | 1/2022 |
| JP | 2007066000 A | * | 3/2007 |
| JP | 4013027 B2 | * | 11/2007 |

* cited by examiner

*Primary Examiner* — Nizar N Sivji
(74) *Attorney, Agent, or Firm* — Edell, Shapiro & Finnan, LLC

(57) ABSTRACT

An image correction method and a processor are disclosed. The method includes performing a feature point search on a quick response (QR) code image to determine multiple feature points, dividing a coded area of the QR code image into multiple sub-regions according to the multiple feature points, determining a compensation vector for each sub-region according to the feature points corresponding to each sub-region, and compensating and correcting each sub-region according to the compensation vector of each sub-region to obtain a corrected image. Thus, the solution provided by the present application can avoid interference between different sub-regions by means of correcting the QR code image in a regional manner using the compensation vectors, thereby more accurately correcting the distortion of the QR code image.

8 Claims, 7 Drawing Sheets

IMAGE CORRECTION METHOD AND PROCESSOR

This application claims the benefit of China application Serial No. CN202111115988.2, filed on Sep. 23, 2021, the subject matter of which is incorporated herein by reference.

BACKGROUND OF THE INVENTION

FIELD OF THE INVENTION

The present application relates to the technical field of image processing, and more particularly to an image correction method and a processor.

DESCRIPTION OF THE RELATED ART

A quick response (QR) code is a common two-dimensional matrix code, and can be applied to flat prints as well as surfaces of objects in various shapes. For example, a QR code including related information of an air conditioner is attached to a surface of the air conditioner for a decoding apparatus (for example, a cellphone or a tablet computer) to capture and is decoded to obtain the related information of the air conditioner. However, distortion in a QR code or an inadequate capturing capability of a decoding apparatus may result in a distorted QR code image captured by a decoding apparatus. To achieve decoding of such distorted QR code image, correction is required.

SUMMARY OF THE INVENTION

The present application provides an image correction method and a processor that can correct distortion of a quick response (QR) code image.

An image correction method provided by the present application includes performing a feature point search on a QR code image to determine a plurality of feature points in the QR code image, dividing a coded area of the QR code image into a plurality of sub-regions according to the feature points, determining a compensation vector for each of the sub-regions according to the feature points corresponding to each of the sub-regions, and compensating and correcting each of the sub-regions according to the compensation vector of each of the sub-regions to obtain a corrected image.

The present application further provides a processor, which executes a computer program to perform an image correction method. The image correction method includes: performing a feature point search on a QR code image to determine a plurality of feature points in the QR code image, dividing a coded area of the QR code image into a plurality of sub-regions according to the feature points, determining a compensation vector for each of the sub-regions according to the feature points corresponding to each of the sub-regions, and compensating and correcting each of the sub-regions according to the compensation vector of each of the sub-regions to obtain a corrected image.

Thus, the present application can avoid interference between different sub-regions by means of correcting the QR code image in a regional manner using the compensation vectors, thereby more accurately correcting the distortion of the QR code image.

BRIEF DESCRIPTION OF THE DRAWINGS

To better describe the technical solution of the embodiments of the present application, drawings involved in the description of the embodiments are introduced below. It is apparent that, the drawings in the description below represent merely some embodiments of the present application, and other drawings apart from these drawings may also be obtained by a person skilled in the art without involving inventive skills.

DETAILED DESCRIPTION OF THE INVENTION

It should be noted that, the principles of the present application are described by taking an example in an appropriate application environment. The specific embodiments of the present application given in the description below serve as examples, and are not to be construed as limitations to other specific embodiments of the present application that are not described herein.

Figure 1:
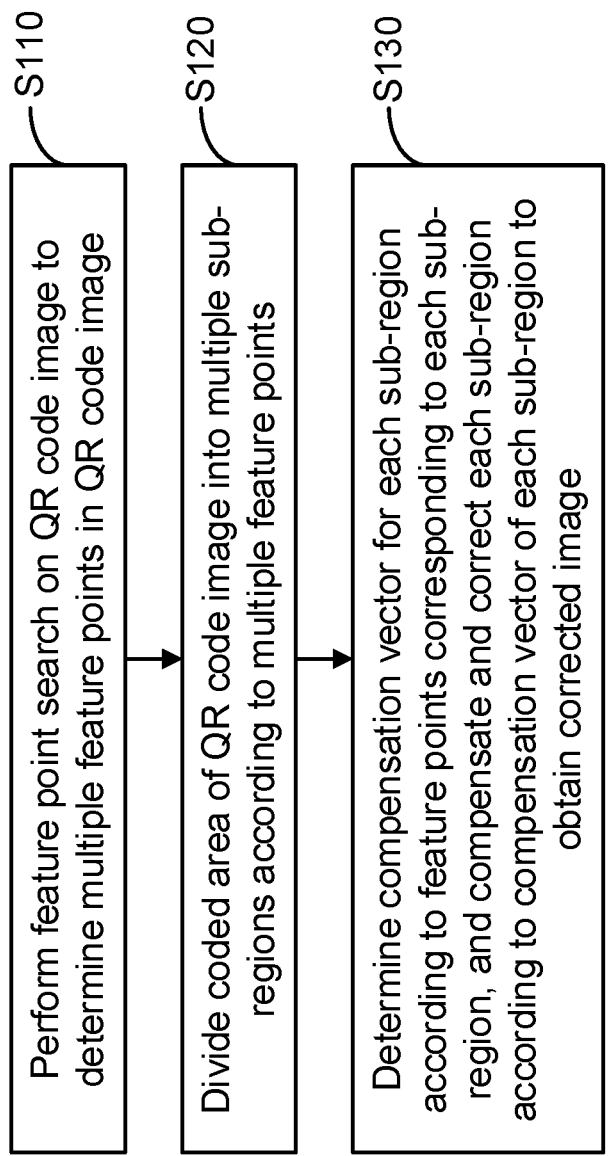
FIG. 1 is a flowchart of an image correction method provided according to the present application.

The solutions provided by the embodiments of the present application relate to the technical field of image processing, and specifically relate to correction of a quick response (QR) code image, and are described in detail in the following embodiments. FIG. 1 shows a flowchart of an image correction method provided according to an embodiment of the present application. As shown in FIG. 1, the method may include the following steps.

In step S110, a feature point search is performed on a QR code image to determine multiple feature points in the QR code image.

More details are given implementing the image correction method on an electronic apparatus as an example. The electronic apparatus is not defined to being a specific form, and may be, for example, a mobile electronic apparatus such as a smartphone or a tablet computer.

In this embodiment, the electronic apparatus includes a processor, and performs the image correction method of the embodiment by means of a computer program. The processor may perform a feature point search on a QR code according to a configured feature point search policy, thereby determining multiple feature points in the QR code image. It should be noted that, the configuration of the feature point search of this embodiment is not specifically defined, and may be configured by a person skilled in the art according to actual requirements. For example, the processor may search the QR code image to find a point having a corner point (which is an extreme point, that is, a point that is particularly outstanding in a certain attribute) feature by using a corner detection algorithm, as a feature point. The corner detection algorithm may include but not limit to, for example, the Harrison algorithm, scale-invariant feature transform (SIFT) algorithm, speeded up robust features (SURF) algorithm and oriented fast and rotated brief (ORB) algorithm.

Moreover, in this embodiment, a source of the QR code image is not specifically defined. For example, when the electronic apparatus is configured with a camera, the electronic apparatus may capture the QR code image by means of configuring the camera, or the electronic apparatus may obtain the QR code image from a network.

In step S120, a coded area of the QR code image is divided into multiple sub-regions according to the multiple feature points.

The processor divides the coded area of the QR code image according to a configured area division policy and the determined multiple feature points. The configuration of the area division policy of this embodiment is not specifically defined, and may be configured by a person skilled in the art according to actual requirements.

In step S130, a compensation vector for each sub-region is determined according to the feature points corresponding to each sub-region, and each sub-region is compensated and corrected according to the compensation vector of each sub-region to obtain a corrected image.

The processor compensates, according to the determined compensation vector, each sub-region of the coded area for offsets caused by distortion to finally obtain a corrected image that is then used for decoding. For example, referring to FIG. 2, after compensating and correcting a distorted QR code image according to regional vectors, the processor obtains a corrected image with compensated module offsets.

In one embodiment, the QR code image is searched to find a plurality of finder patterns therein, and a plurality of feature points are determined according to the plurality of finder patterns found.

A finder pattern (also referred to as a position detection pattern, or a detection pattern) is used for positioning the QR code image. A current QR code image usually includes three finder patterns, which are respectively located on three corners of the QR code image, that is, the lower left corner, the upper left corner and the upper right corner of the QR code image. For example, referring to FIG. 2, the three patterns each appearing a black-white-black quadrilateral is a finder pattern.

It should be noted that, the ratio of black and white pixels in a finder pattern is 1:1:3:1:1, and according to such characteristic, the processor can search the QR code image to find the three finder patterns therein.

For example, in order to achieve a search on the QR code image to find the finder patterns, the processor first establishes a coordinate system, such as establishing a pixel coordinate system by using the upper left vertex of the QR code image as an origin. According to the characteristic that the ratio of black and white pixels in the QR code image is 1:1:3:1:1, the processor scans the QR code image to thereby obtain the three finder patterns therein. For example, columns of the QR code image are scanned in a progressive manner, or scanned in an interlaced manner. The column refers to one column of pixels of the QR code image, and the number of columns of the interlaced manner is not specifically defined and may be configured by a person skilled in the art according to actual requirements. For example, the QR code image may be scanned once at an interval of every three columns, so as to quickly find the three finder patterns therein.

In one embodiment, during the search for the multiple feature points, the processor performs the search according to the plurality of finder patterns determined to find the plurality of feature points. For example, to perform a search to find the three finder patterns, the processor performs the search by using the three finder patterns as search objects to determine the plurality of feature points.

In one embodiment, once the plurality of finder patterns are determined after the search, the processor does not immediately search for the feature points according to the plurality of finder patterns, but first decodes the QR code image according to the plurality of finder patterns. For example, the processor may decode the QR code image by means of perspective transformation, and a decoding result is correspondingly obtained if the decoding is successful. If the decoding has failed, the processor determines that the QR code image contains distortion, and a search is performed at this point according to the plurality of finder patterns to determine the plurality of feature points, so as to correct the distortion of the QR code image.

In one embodiment, the corrected image is decoded to obtain a decoding result.

Figure 2:
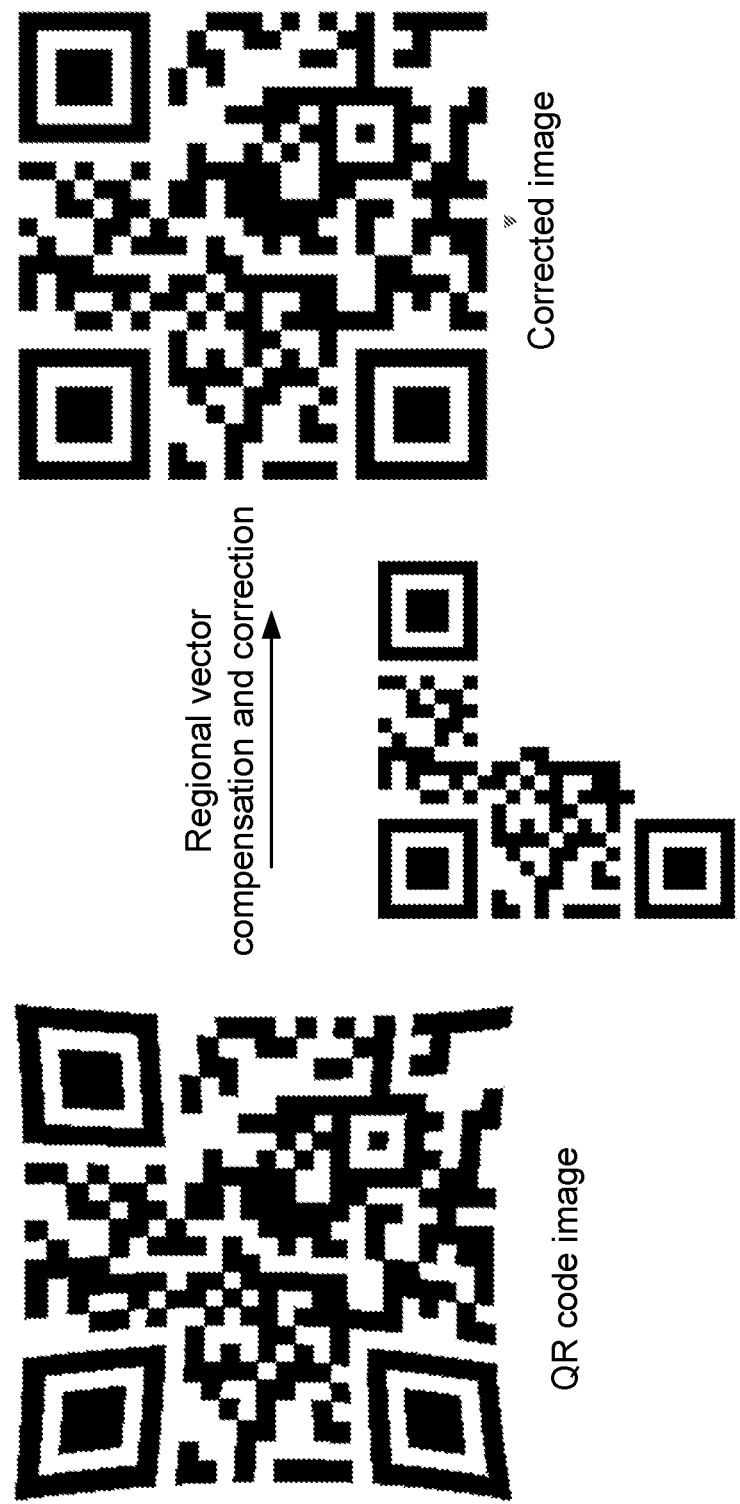
FIG. 2 is an exemplary schematic diagram of a corrected image obtained by compensating a quick response (QR) code image in a regional manner using vectors.

For example, the processor decodes the corrected image in FIG. 2 to obtain a decoding result "20210113 two-dimensional code 1".

In one embodiment, during the search for determining the plurality of feature points according to the plurality of finder patterns, the processor may search each finder pattern to find and determine a plurality of vertices close to the coded area as feature points, and search a correction reference pattern in the QR code image to find and determine a center point as a feature point. The correction reference pattern is similar to the finder pattern, and is also a black and white quadrilateral, which however has a black and white pixel ratio of 1:1:1:1:1. According to this characteristic, the processor may search the QR code image to find the correction reference pattern and search the correction reference pattern to find the center point.

Figure 3:
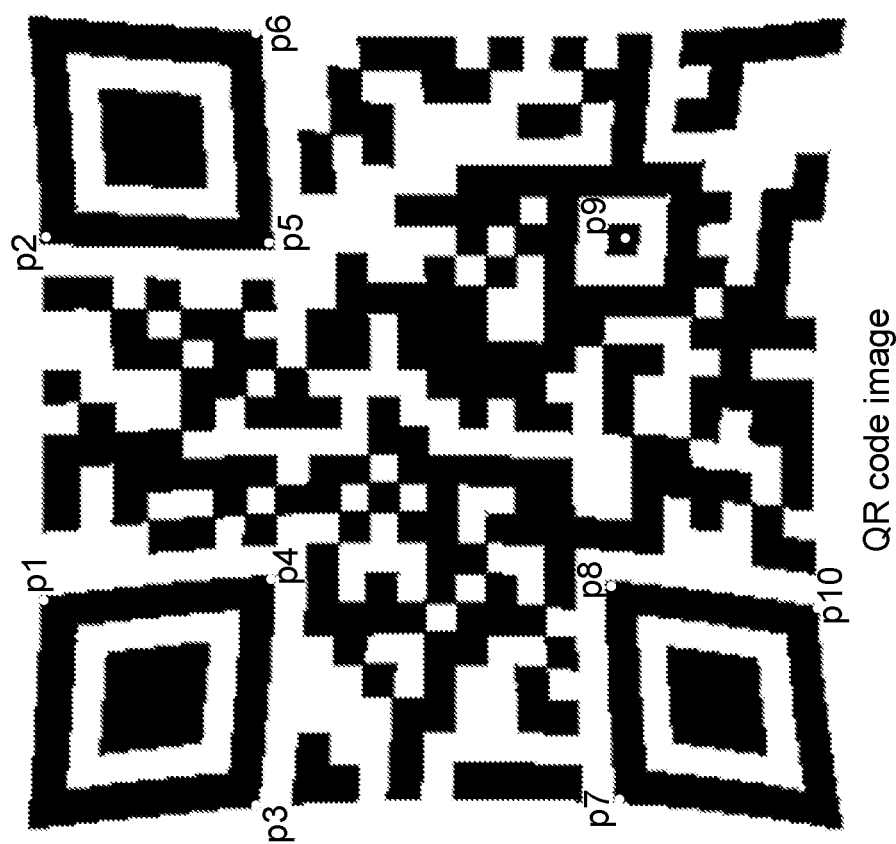
FIG. 3 is an exemplary schematic diagram of feature points found by a search in the present application.

For example, referring to FIG. 3, the processor searches the QR code image and finds an upper-right vertex p1, a lower-right vertex p4 and a lower-left vertex p3 of the upper-left finder pattern close to the coded area, an upper-left vertex p2, a lower-left vertex p5 and a lower-right vertex p6 of the upper-right finder pattern close to the coded area, an upper-left vertex p7, an upper-right vertex p8 and a lower-right vertex p10 of the lower-left finder pattern close to the coded area, and a center point p9 of the correction reference pattern at the lower-right corner, and uses p1, p2, p3, p4, p5, p6, p7, p8, p9 and p10 as the feature points.

It should be noted that, how a search is performed to find the vertices is not specifically defined by this embodiment, and the approach for searching for the vertices can be configured by a person skilled in the art according to actual requirements. For example, the processor may perform a search to find a plurality of vertices of each finder pattern near the coded area by means of morphological erosion dilation or edge detection and Hough transform, and may further calculate boundary equations by locating edges of each finder pattern to calculate a plurality of vertices of each finder pattern close to the coded area.

In one embodiment, during the search for determining a plurality of vertices of each finder pattern close to the coded area as feature points, the processor may search along a search direction by using the center point of each finder pattern as a starting point to determine an outer edge point of each finder pattern, and may search along outer edges of each finder pattern by using the outer edge point of each finder pattern as a starting point to determine a plurality of vertices.

In practice, the search direction may be configured by a person skilled in the art according to actual requirements. For example, either of the x-axis direction or the y-axis direction may be used as the search direction.

Figure 4:
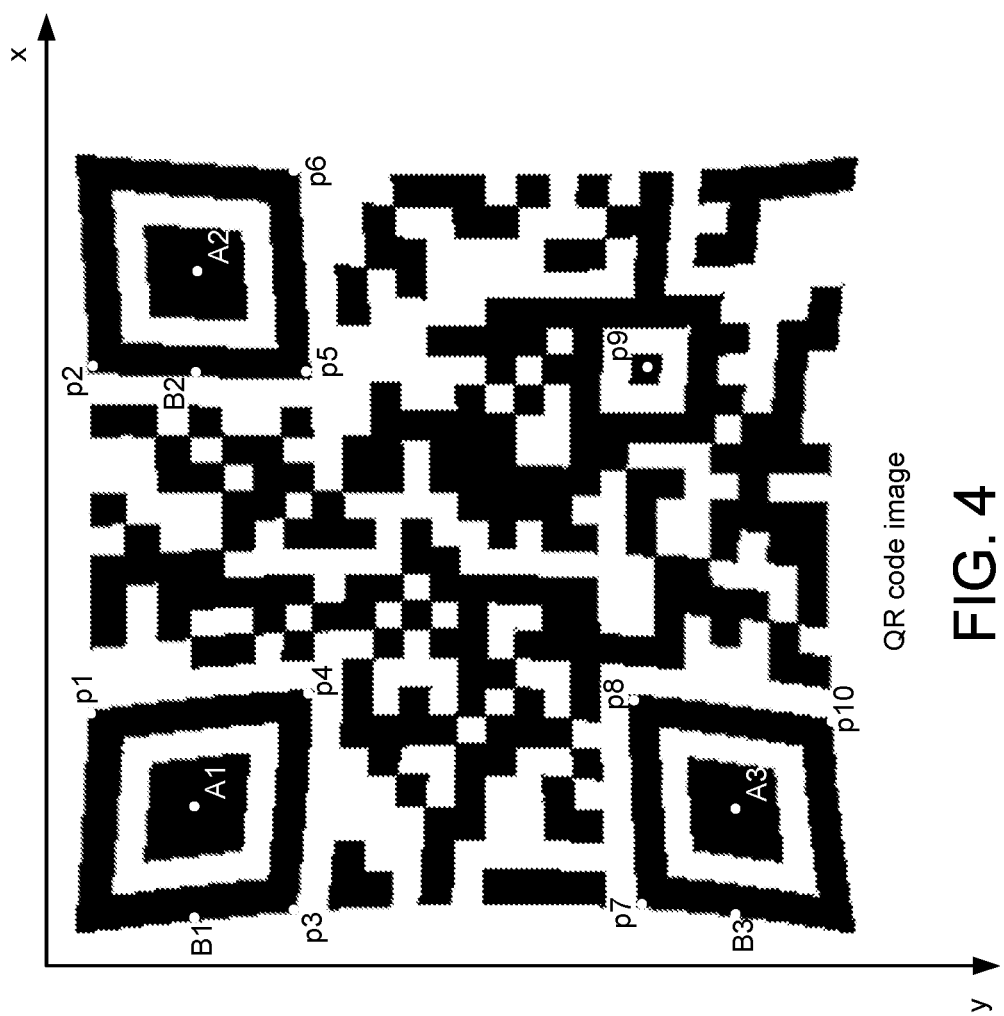
FIG. 4 is an exemplary schematic diagram of a center point and outer edge points of a finder pattern found by a search process on the feature points in FIG. 3 in the present application.

For example, referring to FIG. 4, taking the x-axis direction as the search direction, for the upper-left finder pattern in the QR code image, the processor uses a center point A1 of the finder pattern as a starting point, searches along the negative x-axis direction, determines an outer edge point B1, uses the outer edge point B1 as a starting point, and searches along outer edges of the finder pattern to determine vertices p1, p4 and p3 of the finder pattern close to the coded area. For the upper-right finder pattern in the QR code image, the processor uses a center point A2 of the finder pattern as a starting point, searches along the negative x-axis direction, determines an outer edge point B2, uses the outer edge point B2 as a starting point, and searches along outer edges of the finder pattern to determine vertices p2, p5 and p6 of the finder pattern close to the coded area. For the lower-left finder pattern of the QR code image, the processor uses a center point A3 of the finder pattern as a starting point, searches along the negative x-axis direction, determines an outer edge point B3, uses the outer edge point B3 as a starting point, and searches along outer edges of the finder pattern to determine vertices p7, p8 and p10 of the finder pattern close to the coded area.

In one embodiment, when using an outer edge point of each finder pattern as a starting point and searching along outer edges of each finder pattern to determine a plurality of vertices, the processor uses the outer edge point of each finder pattern as the starting point, and searches along the outer edges of each finder pattern by using an eight neighborhood contour tracking algorithm to determine the plurality of vertices.

The eight neighborhood contour tracking algorithm is also referred to as an eight neighborhood border tracking algorithm, or Moore neighborhood tracking algorithm. In this embodiment, the eight neighborhood contour tracking algorithm is used to track outer edges of each finder pattern to implement the search for the plurality of vertices, hence reducing the amount of computation needed for the search.

In one embodiment, the plurality of finder patterns include the lower-left finder pattern, the upper-left finder pattern and the upper-right finder pattern. When the search for the correction reference pattern has failed, an anchor point is found and used as a feature point according to the upper-right vertex of the lower-left finder pattern, the lower-right vertex of the upper-left finder pattern and the lower-left vertex of the upper-right finder pattern, wherein the anchor point, the upper-right vertex, the lower-right vertex and the lower-left vertex are connected to form a rectangle.

It should be noted that, a QR code currently includes 40 versions, which vary from 21*21 modules (Version 1) to 177*177 modules (Version 40), wherein a QR code of a following version contains four additional modules on each side compared to a QR code of a previous version; for example, the QR code image shown in FIG. 2 corresponds to a QR code of Version 2 containing 25*25 modules. However, not QR codes of all versions have correction reference patterns; for example, a QR code of Version 1 does not have a correction reference pattern. Thus, when the feature point search unit 110 searches for the correction reference pattern, the search may be successful or may fail.

In this embodiment, when the search for the correction reference pattern has failed, the processor may further search for an anchor point as the feature point according to the upper-right vertex of the lower-left finder pattern, the lower-right vertex of the upper-left finder pattern and the lower-left vertex of the upper-right finder pattern. The anchor point, the upper-right vertex, the lower-right vertex and the lower-left vertex are connected to form a rectangle.

Figure 5:
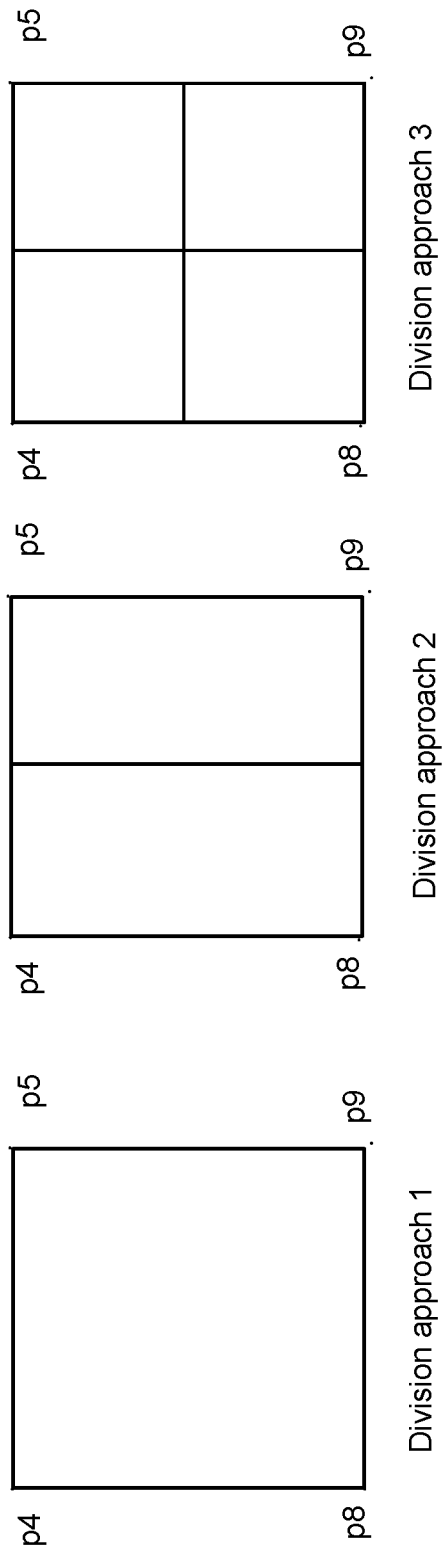
FIG. 5 is an exemplary schematic diagram of three different region division approaches for a same part in a coded area in the present application.

In one embodiment, when a coded area of a QR code image is divided into a plurality of sub-regions, the processor uses a constraint of using at least one feature point as a vertex of a sub-region, and divides the coded area into a plurality of sub-regions according to a plurality of feature points. The approach for dividing the coded area into sub-regions is not specifically defined, and may be configured by a person skilled in the art according to actual requirements. For example, referring to FIG. 5, three different division approaches are shown. According to the feature points p4, p5, p8 and p9, the processor may divide the middle part of the coded area into one sub-region (division approach 1), divide the middle part of the coded area into two sub-regions (division approach 2), or divide the middle part of the coded area into four sub-regions (division approach 3).

In one embodiment, when determining the compensation vector for each sub-region according to feature points corresponding to each sub-region, and compensating and correcting each sub-region according to the compensation vector of each sub-region, the processor determines a horizontal unit compensation vector in a horizontal direction and a vertical unit compensation vector in a vertical direction of each sub-region according to the feature points corresponding to each sub-region, and compensates and corrects each sub-region according to the horizontal unit compensation vector and the vertical unit compensation vector of each sub-region.

For example, for a sub-region, the processor divides a coordinate vector of two corresponding feature points in the horizontal direction of the sub-region by the number of modules between the two feature points to obtain the horizontal unit compensation vector, and divides a coordinate vector of two corresponding feature points in the vertical direction of the sub-region by the number of modules between the two feature points to obtain the vertical unit compensation vector.

In one embodiment, when compensating and correcting each sub-region according to the horizontal unit compensation vector and the vertical unit compensation vector of each sub-region, the processor may obtain a matching template corresponding to the QR code image, use a feature point included in each sub-region as a starting point, search the sub-region for every module therein according to the horizontal unit compensation vector and the vertical unit compensation vector, and map a pixel value of each module found from the search to the matching template to obtain a corrected image.

The processor may identify the version number of a QR code corresponding to the QR code image, and then obtain the corresponding matching template according to the version number. For example, referring to FIG. 4, the processor may calculate according to the finder patterns the number of pixels occupied by one module, and then calculate the number of version of the QR code in FIG. 4 according to coordinates of the center points A1, A2 and A3 of the finder patterns, represented as:

$$V=(((A1A2+A1A3)/2+7)/s-17)/4.$$

In the expression above, V represents the version number, A1A2 represents a coordinate distance between A1 and A2, A1A3 represents a coordinate distance between A1 and A3, and s represents the number of pixels occupied by a side of a module.

In this embodiment, the processor uses a feature point included in each sub-region as a starting point, searches the sub-region for every module therein according to the horizontal unit compensation vector and the vertical unit compensation vector, and maps a pixel value of each module found by the search to the matching template to obtain a corrected image.

Figure 6:
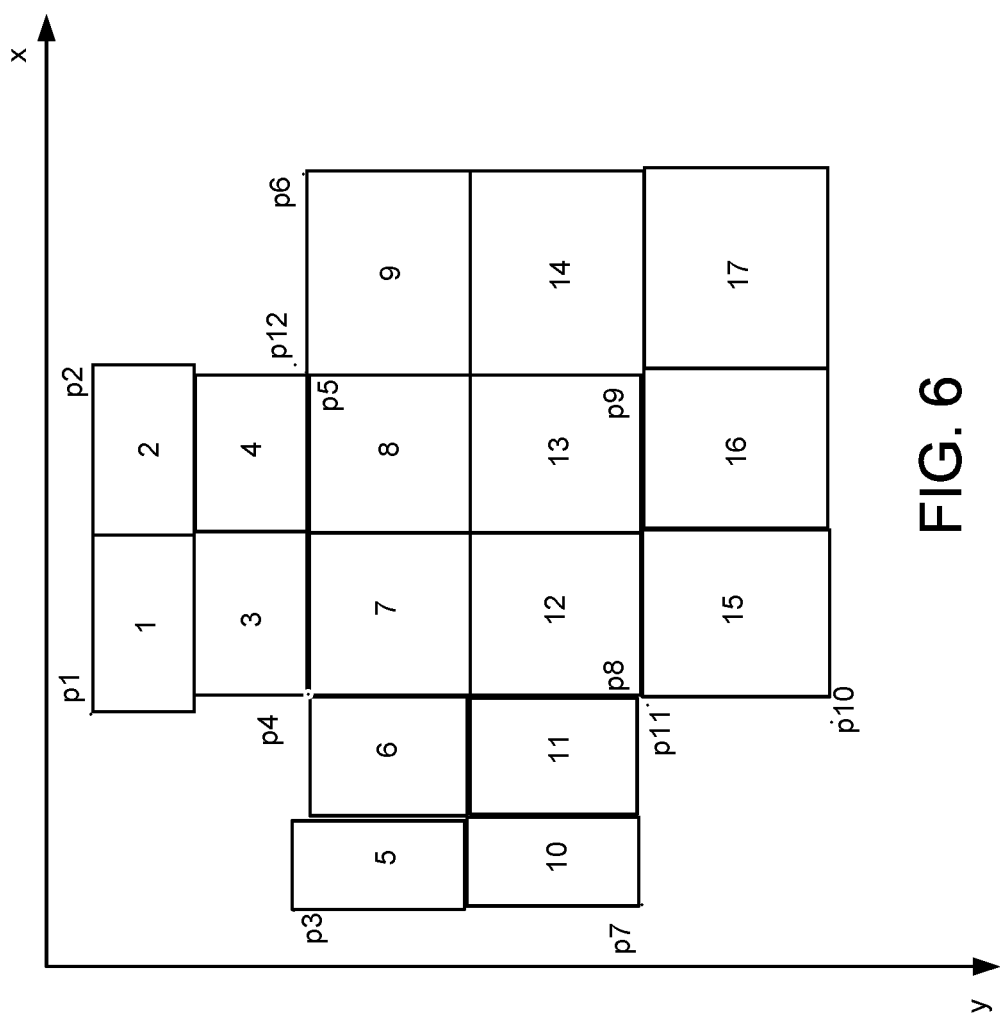
FIG. 6 is an exemplary schematic diagram of dividing a coded area into 17 sub-regions in the present application.

A vector compensation and correction method provided according to the present application is described by taking a sub-region division approach in FIG. 6 as an example.

For the QR code image of Version 2 shown in FIG. 6, 10 feature points, which are respectively p1, p2, p3, p4, p5, p6, p7, p8, p9 and p10, are found. Using p1, p2, p4 and p5, an upper-middle part of the coded area is divided into four sub-regions, which are respectively a sub-region 1, a sub-region 2, a sub-region 3 and a sub-region 4. Using p3, p4, p7 and p8, a middle-left part of the coded area is divided into four sub-regions, which are respectively a sub-region 5, a sub-region 6, a sub-region 10 and a sub-region 11. Using p4, p5, p8 and p9, a center part of the coded area is divided into four sub-regions, which are respectively a sub-region 7, a sub-region 8, a sub-region 12 and a sub-region 13. Using p5, p6, p8 and p9, a middle-right part of the coded area is divided into two sub-regions, which are respectively a sub-region 9 and a sub-region 14. Using p5, p8, p9 and p10, a lower-middle part of the coded area is divided into two sub-regions, which are respectively a sub-region 15 and a sub-region 16. Using p5, p8 and p9, a lower-right part is divided into one sub-region, which is a sub-region 17.

Vector compensation for the sub-region 7 is described as an example.

First of all, the horizontal unit compensation vector and the vertical unit compensation vector of the sub-region 7 are calculated. The corresponding feature points in the horizontal direction (that is, the x-axis direction) of the sub-region 7 are p4 and p5, between which there are a total of 11 modules. The corresponding feature points in the vertical direction (that is, the y-axis direction) are p4 and p8, between which there are a total of 11 modules. Thus, the horizontal unit compensation vector and the vertical unit compensation vector of the sub-region 7 are calculated and obtained according to the equations below:

$$\overline{p4p5}=(p5-p4)/11=(px5-px4,py5-py4)/11;$$

$$\overline{p4p8}=(p8-p4)/11=(px8-px4,py8-py4)/11;$$

wherein, $\overline{p4p5}$ represents the horizontal unit compensation vector of the sub-region 7, $\overline{p4p8}$ represents the horizontal unit compensation vector of the sub-region 7, px represents a horizontal coordinate of the feature point, and py represents a vertical coordinate of the feature point.

Taking p4 as a starting point, a search is performed along the horizontal and vertical direction according to the horizontal unit compensation vector $\overline{p4p5}$ and the vertical unit compensation vector $\overline{p4p8}$ to find a first module spt 7, which may be represented as:

$$spt_7=p4+0.5*\overline{p4p5}+0.5*\overline{p4p8}.$$

Once the coordinates of $spt_7$ are found, a pixel value corresponding to $spt_7$ is mapped to a matching template of Version 2, and the sub-region 7 is continually searched to find other modules $ept_7$, which may be represented as:

$$ept_7=spt_7+i_7*\overline{p4p5}+j_7*\overline{p4p8};$$

wherein, $i_7 \in [1, N_7-1]$, $j_7 \in [1, M_7-1]$, $N_7$ represents the number of modules in the horizontal direction of the sub-region 7, and $M_7$ represents the number of modules in the vertical direction of the sub-region 7.

As described above, each time the $ept_7$ is found, a pixel value corresponding to $ept_7$ is mapped to a matching template of Version 2, until all modules in the sub-region 7 have been corrected.

Vector compensation for the sub-region 12 is described as an example.

Similar to the sub-region 7, this example differs in that, the horizontal unit compensation vector cannot be directly determined according to p8 and p9, but a new feature point p11 geometrically corresponding to p9 needs to be first determined, wherein p11 may be understood as a center point of a block where p8 is located and may found by a search according to p4, p7 and 8, and is represented as:

$$\overline{p4p8}=(p8-p4)/11=(px8-px4,py8-py4)/11;$$

$$\overline{p7p8}=(p8-p7)/7=(px8-px7,py8-py7)/7;$$

$$P11=p8+0.5*\overline{p4p8}-0.5*\overline{p7p8};$$

wherein, in addition to serving as the vertical unit compensation vector of the sub-region 7, $\overline{p4p8}$ further serves as the vertical unit compensation vector of the sub-region 12. Moreover, the horizontal unit compensation vector of the sub-region 12 is obtained according to the equation below:

$$\overline{p11p9}=(p9-p11)/12=(px9-px11,py9-py11)/12;$$

wherein, $\overline{p11p9}$ represents the horizontal unit compensation vector of the sub-region 12.

Taking p8 as a starting point, a search is performed according to the horizontal unit compensation vector p11p9 and the vertical unit compensation vector p4p8 to find a first module $spt_{12}$ in the horizontal direction and the vertical direction, wherein $spt_{12}$ may be represented as:

$$spt_{12}=p8+0.5*\overline{p11p9}-0.5*\overline{p4p8}.$$

Once the coordinates of $spt_{12}$ are found as described above, a pixel value corresponding to $spt_{12}$ is mapped to a matching template of Version 2, and the sub-region 12 is continually searched to find other modules ept12, which may be represented as:

$$ept_{12}=spt_{12}+i_{12}*\overline{p11p9}-j_{12}*\overline{p4p8};$$

wherein, $i_{12} \in [1, N_{12}-1]$, $j_{12} \in [1, M_{12}-1]$, $N_{12}$ represents the number of modules in the horizontal direction of the sub-region 12, and $M_{12}$ represents the number of modules in the vertical direction of the sub-region 12.

As described above, each time the $ept_{12}$ is found, a pixel value corresponding to $ept_{12}$ is mapped to a matching template of Version 2, until all modules in the sub-region 12 have been corrected.

Vector compensation for the sub-region 17 is described as an example.

Similar to the sub-region 12, the horizontal unit compensation vector cannot be directly determined according to the corresponding feature points p8 and p9 in the horizontal direction of the sub-region 17, and the vertical unit compensation vector cannot be directly determined according to the corresponding feature points p5 and p9 in the vertical direction of the sub-region 17. Alternatively, a new feature point p11 geometrically correspondingly to p9 in the horizontal direction, and a new feature point p12 geometrically corresponding to p9 in the vertical direction need to be first determined.

p12 may be understood as a center point of a block where p5 is located and may be found by a search using p2, p5 and p6, and is represented as:

$$\overline{p5p2}=(p2-p5)/7=(px2-px5,py2-py5)/7;$$

$$\overline{p5p6}=(p6-p5)/7=(px6-px5,py6-py5)/7;$$

$$p12=p5+0.5*\overline{p5p2}+0.5*\overline{p5p6}.$$

Since there are 12 modules between p11 and p9 and there are also 12 modules between p9 and p12, the horizontal unit compensation vector and the vertical unit compensation vector of the sub-region 17 are obtained according to equations below:

$$\overline{p11p9}=(p9-p11)/12=(px9-px11,py9-py11)/12;$$

$$\overline{p12p9}=(p9-p12)/12=(px9-px12,py9-py12)/12;$$

wherein, p11p9 represents the horizontal unit compensation vector of the sub-region 17, and $\overline{p12p9}$ represents the vertical unit compensation vector of the sub-region 17.

p9 is used as the first module, a pixel value corresponding to $spt_9$ is mapped to a matching template of Version 2, and the sub-region 17 is continually searched to find other modules $ept_{17}$, which may be represented as:

$$ept_{17}=p9+i_{17}*\overline{p11p9}+j_{17}*\overline{p12p9};$$

wherein, $i_{17}\in[1, N_{17}-1]$, $j_{17}\in[1, M_{17}-1]$, $N_{17}$ represents the number of modules in the horizontal direction of the sub-region 17, and $M_{17}$ represents the number of modules in the vertical direction of the sub-region 17.

As described above, each time the $ept_{17}$ is found, a pixel value corresponding to $ept_{17}$ is mapped to a matching template of Version 2, until all modules in the sub-region 17 have been corrected.

Specific details of vector compensation approaches for different types of sub-regions are as described above. Implementation details for other sub-regions can be referred from the details of vector compensation approaches for the corresponding types of sub-regions and are omitted herein.

It should be noted that, because the position of a finder pattern is fixed, a pixel value of a finder pattern can be directly correspondingly filled in a matching template to obtain a complete final corrected image.

Figure 7:
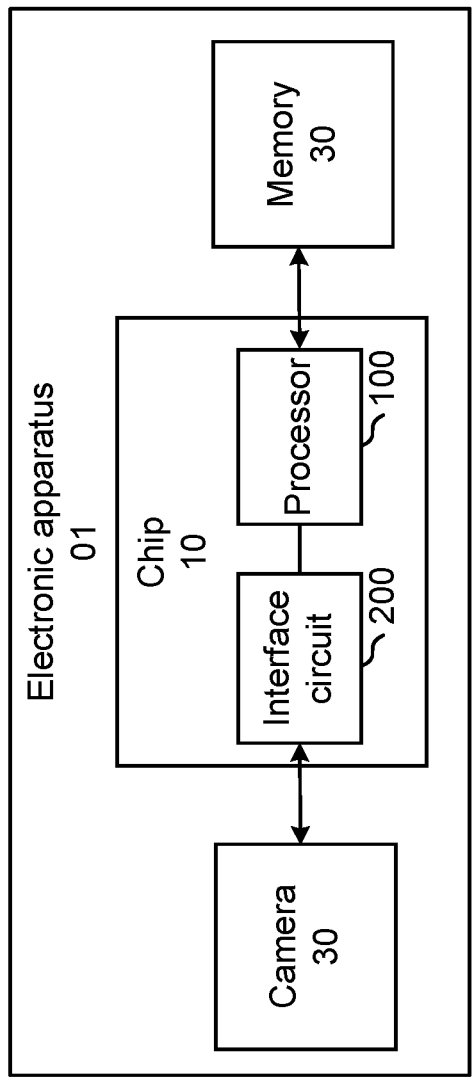
FIG. 7 is a block schematic diagram of an electronic apparatus 01 according to an embodiment of the present application.

Referring to FIG. 7, the present application further provides an electronic apparatus 01 including a chip 10, a memory 20 and a camera 30.

The camera 30 includes at least one lens and an image sensor. The lens is for projecting external light signals to the image sensor. The image sensor is for performing photoelectric conversion on the light signals projected by the lens, and converting the light signals into usable electrical signals to obtain a digital image. The camera 30 may capture an image of any QR code to obtain a QR code image.

The chip 10 includes an interface circuit 200 and a processor 100. The interface 200 is for acquiring the QR code image captured by the camera and may be implemented by a Mobile Industry Processor Interface (MIPI). The processor 100 implements the image correction method of the present application by executing a computer program in the memory 20, divides a coded area of the QR code image acquired by the interface circuit 200 into a plurality of sub-regions, and compensates and corrects the plurality of sub-regions to obtain a corrected image.

The memory 20 may be implemented by a high-speed random access memory, or a non-volatile memory, for example, at least one of a magnetic disk storage device, a flash memory device, and other volatile solid-state storage devices.

A person skilled in the art can understand that, all or part of the steps of the methods of the embodiments above may be completed by a computer program or instruction, or may be performed by related hardware controlled by an instruction, wherein the computer program or instruction may be stored in a computer readable storage medium and be loaded and executed by a chip.

The image correction method and processor provided according to the embodiments of the present application are as described in detail above. Specific examples are applied in the literature to describe the principles and implementation details of the present application, and it should be noted that the description of the embodiments is for merely better understand the present application. Further, modifications may be made to the specific implementations and application ranges by a person skilled in the art according to the concepts of the present application. In conclusion, the contents of the description should not be construed as limitations to the present application.

What is claimed is:
1. An image correction method, comprising:
performing a feature point search on a quick response (QR) code image to determine a plurality of feature points in the QR code image;
dividing a coded area of the QR code image into a plurality of sub-regions according to the feature points; and
determining a compensation vector for each of the sub-regions according to the feature points corresponding to each of the sub-regions, and compensating and correcting each of the sub-regions according to the compensation vector of each of the sub-regions to obtain a corrected image,
wherein the step of performing a feature point search on a QR code image to determine a plurality of feature points in the QR code image comprises:
searching the QR code image to find a plurality of finder patterns therein; and
finding and determining the feature points according to the finder patterns,
wherein the step of finding and determining the feature points according to the finder patterns comprises:
searching each of the finder patterns to find a plurality of vertices close to the coded area therein as the feature points, and searching a correction reference pattern in the QR code image to find a center point therein as one of the feature points, and
wherein the step of searching each of the finder patterns to find a plurality of vertices close to the coded area therein as the feature points comprises:
searching along a search direction by using a center point of each of the finder patterns as a starting point to determine an outer edge point of each of the finder patterns, and searching along outer edges of each of the finder patterns by using the outer edge point as a starting point of each finder pattern to determine the vertices.

2. The image correction method of claim 1, before the step of finding and determining the feature points according to the finder patterns, the method further comprising:
decoding the QR code image according to the finder patterns; and when the decoding of the QR code image has failed, determining the feature points according to the finder patterns.

3. The image correction method of claim 1, wherein the step of searching along outer edges of each of the finder patterns by using the outer edge point as a starting point of each finder pattern to determine the vertices comprises:
searching along the outer edges of each of the finder patterns by using the outer edge point of each of the finder patterns as the starting point and an eight neighborhood contour tracking algorithm to determine the vertices.

4. The image correction method of claim 1, wherein the finder patterns comprise a lower-left finder pattern, an upper-left finder pattern and an upper-right finder pattern, the image correction method further comprising:
when the search for the correction reference pattern has failed, searching for and using an anchor point as the feature point according to an upper-right vertex of the lower-left finder pattern, a lower-right vertex of the upper-left finder pattern and a lower-left vertex of the upper-right finder pattern, wherein the anchor point, the upper-right vertex, the lower-right vertex and the lower-left vertex are connected to form a rectangle.

5. An image correction method, comprising:
performing a feature point search on a quick response (QR) code image to determine a plurality of feature points in the OR code image;
dividing a coded area of the OR code image into a plurality of sub-regions according to the feature points; and
determining a compensation vector for each of the sub-regions according to the feature points corresponding to each of the sub-regions, and compensating and correcting each of the sub-regions according to the compensation vector of each of the sub-regions to obtain a corrected image,
wherein the step of dividing a coded area of the QR code image into a plurality of sub-regions according to the feature points comprises:
dividing the coded area into the sub-regions according to the feature points by using a constraint of regarding at least one of the feature points as a vertex of one of the sub-regions, and
wherein the step of determining a compensation vector for each of the sub-regions according to the feature points corresponding to each of the sub-regions, and compensating and correcting each of the sub-regions according to the compensation vector of each of the sub-regions to obtain a corrected image comprises:
determining a horizontal unit compensation vector in a horizontal direction and a vertical unit compensation vector in a vertical direction of each of the sub-regions according to the feature points corresponding to each of the sub-regions; and
compensating and correcting each of the sub-regions according to the horizontal unit compensation vector and the vertical unit compensation vector of each of the sub-regions.

6. The image correction method of claim 5, wherein the step of compensating and correcting each of the sub-regions according to the horizontal unit compensation vector and the vertical unit compensation vector of each of the sub-regions comprises:
acquiring a matching template corresponding to the QR code image; and
searching each of the sub-regions for each module therein according to the horizontal unit compensation vector and the vertical unit compensation vector by using the feature point included in each of the sub-regions as a starting point, and mapping a pixel value of the each module found by the search to the matching template to obtain the corrected image.

7. A processor, executing a computer program to implement an image correction method, the image correction method comprising:
performing a feature point search on a quick response (QR) code image to determine a plurality of feature points in the QR code image;
dividing a coded area of the QR code image into a plurality of sub-regions according to the feature points; and
determining a compensation vector for each of the sub-regions according to the feature points corresponding to each of the sub-regions, and compensating and correcting each of the sub-regions according to the compensation vector of each of the sub-regions to obtain a corrected image,
wherein the step of performing a feature point search on a QR code image to determine a plurality of feature points in the QR code image comprises:
searching the QR code image to find a plurality of finder patterns therein; and
finding and determining the feature points according to the finder patterns,
wherein the step of finding and determining the feature points according to the finder patterns comprises:
searching each of the finder patterns to find a plurality of vertices close to the coded area therein as the feature points, and searching a correction reference pattern in the QR code image to find a center point therein as one of the feature points, and
wherein the step of searching each of the finder patterns to find a plurality of vertices close to the coded area therein as the feature points comprises:
searching along a search direction by using a center point of each of the finder patterns as a starting point to determine an outer edge point of each of the finder patterns, and searching along outer edges of each of the finder patterns by using the outer edge point as a starting point of each finder pattern to determine the vertices.

8. The processor of claim 7, wherein the step of dividing a coded area of the QR code image into a plurality of sub-regions according to the feature points comprises:
dividing the coded area into the sub-regions according to the feature points by using a constraint of regarding at least one of the feature points as a vertex of one of the sub-regions.

* * * * *